July 31, 1923.
J. N. RICHARDS ET AL
1,463,487
MOUNTING STEERING WHEEL
Filed Oct. 17, 1921
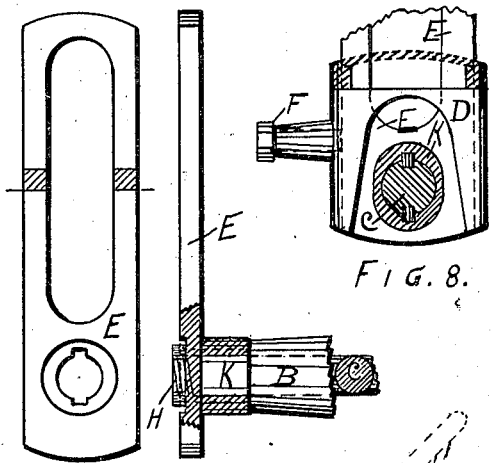
FIG. 3.
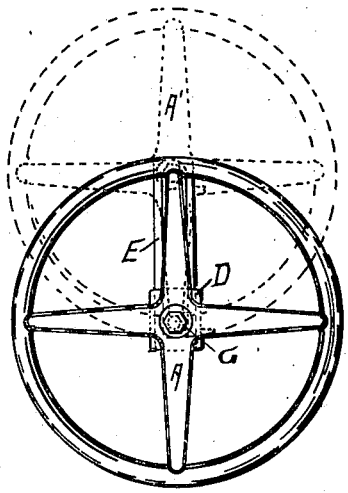
FIG. 8.
FIG. 2.
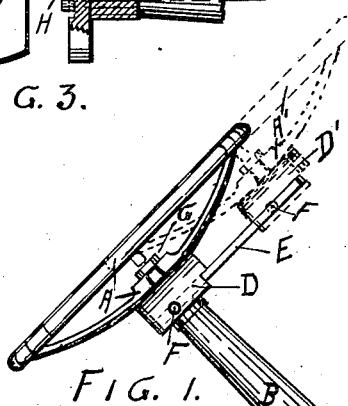
FIG. 1.
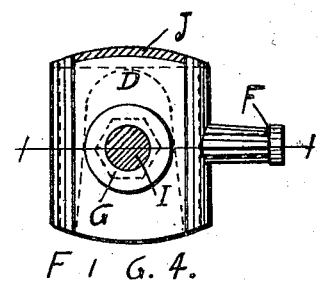
FIG. 4.
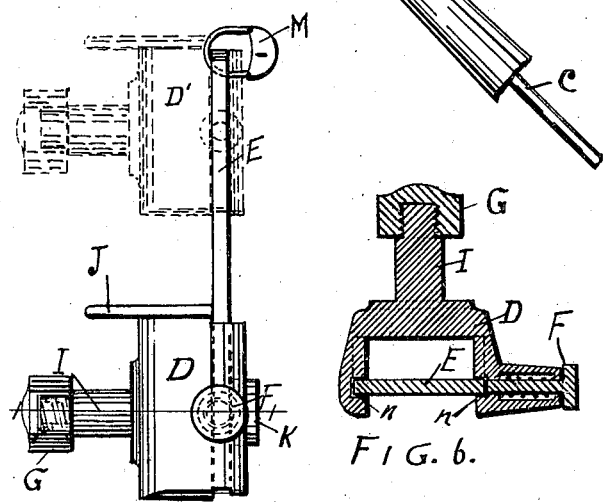
FIG. 5.
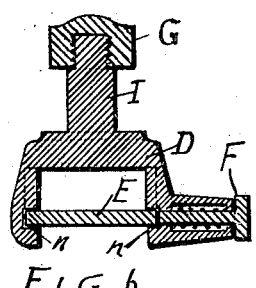
FIG. 6.
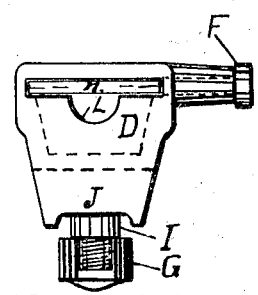
FIG. 7.
Inventors
Jas. N. Richards
H. D. Westman & W. H. Westman
per. S. G. Kinsey
Attorney.

Patented July 31, 1923.

1,463,487

UNITED STATES PATENT OFFICE.

JAMES N. RICHARDS, WILLIAM H. WESTMAN, AND ALFRED D. WESTMAN, OF CHATHAM, CANADA.

MOUNTING STEERING WHEEL.

Application filed October 17, 1921. Serial No. 508,402.

*To all whom it may concern:*

Be it known that we, JAMES N. RICHARDS, WILLIAM H. WESTMAN, and ALFRED D. WESTMAN, citizens of the Dominion of Canada, residing at Chatham, in the county of Kent and Province of Ontario, Canada, have invented new and useful Improvements for Mounting Steering Wheels, of which the following is a specification.

Our invention relates to improvements in separate attachments for steering wheels, with the object of utilizing the existing wheel, to furnish simple and moderate priced attachments by which the wheel can be made to slide up out of the way when required to get in and out of a car; and that can be locked to prevent the wheel being utilized.

We attain these objects by the mechanism illustrated in the accompanying drawings, in which,—

Fig. 1 is a view of a wheel on an attachment secured to the steering post,

Fig. 2 is a front view of the wheel,

Fig. 3 is a front and side view of the slide attachment,

Fig. 4 is a front view of the body,

Fig. 5 is a side view of body on the slide attachment,

Fig. 6 is a sectional view,

Fig. 7 is a top view, and

Fig. 8 is a back view of the body on the slide attachment.

Similar letters refer to similar parts throughout the several views.

At Fig. 1 is shown the wheel A. attached to the auxiliary post I. of the body D. and fastened thereto by means of a threaded nut and key. The body D. is provided with grooves N. Figs. 6 and 7, to enable it to move up and down on the slide E. which is attached to the upper end of the steering post C. within the column B., and held in place by a threaded nut and key. The dotted lines in Figs. 1, 2 and 5 show the wheel raised up out of the way; Fig. 2 is a front view of Fig. 1, Fig. 3 is a half size view of the slide E. showing how it is attached to the steering post C. Figs. 4, 5, 6, 7 and 8 are also half size views, Fig. 4 being a front view showing the fastening device F. at one side, consisting of a draw pin and re-acting spring. Fig. 5 a side view showing the auxiliary post I., and the wheel rest J. It also shows the body D. in dotted lines at the top of the slide E. and fastened thereto by a lock M. Fig. 6 is a sectional view of the body shown on the line 1—1 of Figs. 4 and 5, Fig. 7 is a top view particularly showing the bearing projection J. and the curve L. for insertion of a lock M. and in Fig. 8 is shown the slide E. inside the body and how the said slide is fastened to the steering post C. as formerly described. To apply these attachments we remove the existing wheel from the post C. and fasten the slide E. in its place with the nut and key that was removed when taking off the wheel. The wheel A. is then mounted on the auxiliary post I. of the body D. with one arm of the wheel resting in the projection J. shown in Figs. 5 and 7 and fastened thereto by the nut G. The body D. is then placed on the slide E. so that the auxiliary post I. will register in direct line with the post C. within the steering column, and fastened thereto by means of the fastening device F. when it is desired to get in or out of the car the fastener F. is withdrawn and wheel slid upward as shown by dotted lines in Figs. 1 and 2 and locked if desired. The particular advantages found in the use of these attachments are first that the existing plain wheel does not require to be discarded, and a sliding wheel purchased, to have the benefits of the steering wheel to get in and out of a car; second, there are practically only two parts to the attachments, viz:—the body and the slide, and third, the existing wheel is used.

Having described the different parts of our device, their advantages, and the mode of application, we claim as our invention and wish to secure by Letters Patent:

A sliding body having an auxiliary post projecting from its front, a forward projection at its top to engage the arm of a steering wheel, with means to fasten a steering wheel thereto, sliding means to secure said body to a slide, said slide being mounted on the steering post of a vehicle, a draw pin and re-acting spring as means to fasten said body to said slide, and means to secure said slide to steering post of a vehicle.

Dated at Chatham, Ont., this 5th day of October, 1921.

JAS. N. RICHARDS.
A. D. WESTMAN.
W. H. WESTMAN.